ns Patent Office 3,340,123
Patented Sept. 5, 1967

3,340,123
EXTRUSION COATING WITH LINEAR POLY-PROPYLENE AND BRANCHED POLYETH-YLENE BLEND
Frank Otho Kurt Osmon, Jr., Orange, Tex., assignor to E. I. du Pont de Nemours and Company, Wilmington, Del., a corporation of Delaware
No Drawing. Filed Apr. 5, 1963, Ser. No. 270,803
7 Claims. (Cl. 156—244)

This invention relates to a new composition of matter suitable for use in extrusion coating operations. More particularly, this invention relates to a composition and a method for extrusion coating of sheet-like material, such as paper, with a composition containing a predominant amount of polypropylene. Specifically, this invention relates to a blend of linear polypropylene and low density polyethylene in which the polypropylene is present in the amount of between 85 and 95% by weight of the composition and in which the polyethylene is present in the amount of from 5 to 15% by weight of the composition.

It is known in the art to coat various objects by extrusion technique. For example, it is known to apply insulation to the surface of a wire by passing the wire through a die out of which resin is extruded. It is also known to coat paper and other sheet-like substances by extrusion techniques. Such a process is disclosed in British Patent 688,637, published Mar. 11, 1953. According to the process of this patent, resin is extruded through a die having a narrow slit orifice. This forms a molten film. The molten film then passes through nip rollers where it contacts the paper or other object to be coated. In most instances, the molten film contacts the paper just prior to reaching the nip rollers. In the usual operation the rollers and the paper are moving at a rate faster than the resin is extruded from the die resulting in stretching or drawing of the resin being extruded. This results in the formation of a very thin coating on the surface being coated. Although this process is highly satisfactory when used with polyethylene, the process is ineffective when carried out on polypropylene resin.

It would be highly desirable to be able to coat paper or other sheet-like materials with polypropylene as the resulting article would have a higher melting surface, lower moisture vapor transmission rate, superior abrasion-resistance, and superior grease-resistance, than that of a similarly coated polyethylene object. It is one of the objects of the present invention to provide an article of this type. It is a further object of this invention to provide a resin which is predominantly polypropylene that may be extrusion-coated onto paper or other sheet-like materials at a rate sufficient to render the process commercially practicable. It is a further object of this invention to provide a resin that is predominantly polypropylene that may be extrusion-coated onto paper or other sheet-like objects without the problems of tearing or resin instability that have rendered previous attempts to operate with polypropylene unsatisfactory. It is a further object of this invention to form a predominantly polypropylene resin that may be drawn from a slit-type die to form high melting point, highly abrasion-resistant, highly moisture vapor impermeable, coatings on surfaces of paper and sheet-like materials in such a manner that the final coating on the article is much thinner than the film extruded from the narrow slit orifice.

The above objects are accomplished according to the present invention by blending linear, normally solid polypropylene having a melt index measured at 190° C. of between about 10 g./10 min. and about 40 g./10 min. and a density of between 0.85 and 0.91, with low-density branched, normally solid polyethylene having a melt index (190° C.) of between about 2 g./min. and about 10 g./min. (Melt index is measured by ASTM Method D–1238–52T. The low-density polyethylene has a density at 23° C. of about 0.917 to about 0.93 g./c.c. The proportion of the ingredients is quite critical and the polypropylene should comprise between 85 and 95% by weight of the composition, and the polyethylene should comprise between 5 and 15% by weight of the composition. The melt index of the blend will generally vary from about 20 g./10 min. to about 80 g./10 min.

In the following examples which illustrate the best mode for carrying out the invention, all parts and percentages are in parts by weight, unless otherwise specified.

*Example I*

A blend of 90 parts linear polypropylene having a melt index of about 28 was mixed with 10 parts of branched polyethylene having a melt index of about 4 and a density of about .92, was prepared by extrusion through a 2-inch extruder equipped with a mixing torpedo. The blend had a melt index of about 50. The blend was then heated to 302° C., and extruded from a die having a slit-like aperture 20 mils wide and 18 inches long. The extruded material was passed through nip rolls along with kraft paper. The kraft paper was moved at different speeds to test the degree of draw which could be achieved using this blend. The maximum draw that could be achieved was 530 ft./min., that is, the paper could be pulled to the nip rolls with the polypropylene blend film at 530 ft./min. This resulted in a uniform polymer film having a thickness of 0.46 mil.

The film in addition to decreasing in its 20-mil dimension also decreased in its 18-inch dimension. This decrease is termed "neck-in" and is measured on each side of the film. The polypropylene blend of this example had a neck-in at 1 mil thickness of about 0.97 inch, that is, the polypropylene film was approximately 16 inches wide as it was extruded on the paper at a thickness of 1 mil.

*Example II*

A blend was prepared using 85 parts polypropylene having a melt index of 28 and 15 parts branched polyethylene having a melt index of about 4. The blend was again prepared in an extruder such as described in Example I. The mixture was then extruded from the same die as disclosed in Example I at a temperature of 302° C. The blend had a melt index of approximately 32. The maximum draw that could be achieved for this blend was 450 ft./min. When the speed of the paper in the nip rolls was increased beyond this, the film became unstable and tore. The minimum thickness of the film on the paper at this speed was 0.54 mil. The blend necked-in at 1 mil thickness to the extent of 0.59 inch.

*Example III*

A blend of 95 parts linear polypropylene having a melt index of about 28 and 5 parts of branched polyethylene having a melt index of about 4 was blended in an extruder by the method disclosed in Example I. The blend was then extruded at 302° C. through the die disclosed in Example I. The maximum draw obtained using this blend was about 375 ft./min. This resulted in a film thickness of about .68 mil. The neck-in of the film was about 1.0 inch measured on a 1-mil film.

For purposes of comparison a polypropylene having a melt index of about 28 was extruded through the die disclosed in Example I at a temperature of 302° C. onto a paper as it passed through nip rolls. The maximum draw that could be achieved using this resin was 220 ft./min. This film became unstable and tore when the speed was increased above this rate. The minimum thickness of the film that could be obtained using this resin was 1.21 mils. The neck-in of this film at a 1-mil thickness was *calculated* to be 0.56 inch. It can thus be seen by comparing Examples I, II, and III with this resin that the degree of draw, the rate of cooling, and the thinness of the film can be greatly enhanced by using the blends of this invention. Although the examples are drawn to applying coatings to paper, it is readily apparent that this process can also be carried out using the blends of this invention to coat other sheet-like materials, such as metal foil, especially aluminum foil, other thermoplastic films, knitted fabric, wood veneers, fibers composed of materials such as nylon, synthetic resins, glass, wood, metal foil, and other thermoplastic films. Stabilizers can be included in the resin to insure that its properties do not degrade.

I claim:

1. A resin blend for use in the extrusion coating of a strip moving at such a rate as to stretch the resin extruded and thereby form a coating that is thinner than the distance between the lips of the die, consisting essentially of 85 to 95 parts by weight of normally solid linear polypropylene and from 5 to 15 parts by weight branched normally solid polyethylene, said polyethylene having a melt index of between 2 and 10 grams per 10 minutes as measured by ASTM Method D–1238–52T.

2. The composition of claim 1 in which the polypropylene has a density of between 0.85 and 0.91 and in which the polyethylene has a density of between 0.917 and 0.930.

3. A resin blend for extrusion coating comprising 85 to 95 parts by weight normally solid linear polypropylene and a complemental amount from 5 to 15 parts by weight branched polyethylene, said polyethylene having a melt index of between 2 and 10 grams per 10 minutes as measured by ASTM Method D–1238–52T, said blend having a melt index of about 20 to about 80 grams per 10 minutes.

4. The composition of claim 3 in which the branched polyethylene has a melt index of about 4 grams per 10 minutes.

5. The composition of claim 3 in which the polypropylene has a density of between 0.85 and 0.91 and a melt index between about 10 and about 40 grams per 10 minutes.

6. In a process for the preparation of extrusion-coated objects in which molten resin is extruded from a slit-type orifice onto a moving sheet to be coated, said sheet moving at a rate sufficiently high to draw the resin extruded into a film that is substantially thinner than the distance between the lips of the die, the improvement which comprises extruding a blend of normally solid linear polypropylene and branched normally solid polyethylene, said blend consisting essentially of from 85 to 95 parts by weight linear polypropylene and from 5 to 15 parts by weight branched polyethylene, said polyethylene having a melt index of between 2 and 10 grams per 10 minutes as measured by ASTM Method D–1238–52T.

7. The process of claim 6 in which the blend has a melt index of between about 20 and about 80 grams per 10 minutes, and in which the normally solid linear polypropylene has a melt index of between about 10 and about 40 grams per 10 minutes.

References Cited

UNITED STATES PATENTS

| | | | |
|---|---|---|---|
| 3,121,070 | 2/1964 | Coover et al. | 260—897 |
| 3,161,560 | 12/1964 | Paquin et al. | 161—250 |
| 3,183,283 | 5/1965 | Reding | 260—897 |
| 3,192,288 | 6/1965 | Sayko et al. | 260—897 |
| 3,254,139 | 5/1966 | Anderson et al. | 260—897 |

EARL M. BERGERT, *Primary Examiner.*

W. E. HOAG, *Assistant Examiner.*